US012161971B2

United States Patent
Gunugunuri et al.

(10) Patent No.: US 12,161,971 B2
(45) Date of Patent: Dec. 10, 2024

(54) CATALYST FOR DIRECT NOX DECOMPOSITION AND A METHOD FOR MAKING AND USING THE CATALYST

(71) Applicant: Toyota Motor Engineering and Manufacturing North America, Inc., Erlanger, KY (US)

(72) Inventors: Krishna Gunugunuri, Canton, MI (US); Charles A. Roberts, Farmington Hills, MI (US); Torin C. Peck, Ann Arbor, MI (US)

(73) Assignee: TOYOTA MOTOR ENGINEERING AND MANUFACTURING NORTH AMERICA, INC., Plano, TX (US)

( * ) Notice: Subject to any disclaimer, the term of this patent is extended or adjusted under 35 U.S.C. 154(b) by 473 days.

(21) Appl. No.: 16/670,234

(22) Filed: Oct. 31, 2019

(65) Prior Publication Data

US 2021/0129081 A1    May 6, 2021

(51) Int. Cl.
| | | |
|---|---|---|
| B01D 53/94 | (2006.01) | |
| B01J 6/00 | (2006.01) | |
| B01J 23/00 | (2006.01) | |
| B01J 23/34 | (2006.01) | |
| B01J 23/72 | (2006.01) | |
| B01J 23/75 | (2006.01) | |

(Continued)

(52) U.S. Cl.
CPC ..... *B01D 53/9427* (2013.01); *B01D 53/9431* (2013.01); *B01J 23/005* (2013.01); *B01J 23/34* (2013.01); *B01J 23/72* (2013.01); *B01J 23/75* (2013.01); *B01J 37/0236* (2013.01); *B01J 37/03* (2013.01); *B01J 6/001* (2013.01)

(58) Field of Classification Search
None
See application file for complete search history.

(56) References Cited

U.S. PATENT DOCUMENTS

| | | |
|---|---|---|
| 3,842,015 A | 10/1974 | Vogt et al. |
| 3,865,923 A | 2/1975 | Stephens |
| 3,929,681 A | 12/1975 | Buonomo et al. |

(Continued)

FOREIGN PATENT DOCUMENTS

| | | |
|---|---|---|
| CN | 103752322 A | 4/2014 |
| CN | 105642308 A | 6/2016 |

(Continued)

OTHER PUBLICATIONS

Russo et al ("N2O catalytic decomposition over various spinel-type oxides", Cata Today 119 (2007) 228-232). (Year: 2007).*

(Continued)

*Primary Examiner* — Michael Forrest
(74) *Attorney, Agent, or Firm* — Jordan IP Law, LLC

(57) ABSTRACT

Catalyst material comprising a ternary spinel mixed oxide for treatment of an exhaust gas stream via direct decomposition removal of NOx to $N_2$ and $O_2$. The low temperature (from about 400° C. to about 650° C.), direct decomposition is accomplished without the need of a reductant molecule. In one example, Mn may be incorporated into metal oxide, such as $Cu_yCo_{3-y}O_4$ spinel oxide, synthesized using co-precipitation techniques.

14 Claims, 6 Drawing Sheets

(51) Int. Cl.
  *B01J 37/02* (2006.01)
  *B01J 37/03* (2006.01)

(56) References Cited

U.S. PATENT DOCUMENTS

| | | | |
|---|---|---|---|
| 5,260,035 A * | 11/1993 | Lachman | B01D 53/9481 422/180 |
| 5,407,651 A | 4/1995 | Kawai | |
| 5,580,534 A | 12/1996 | Hartweg et al. | |
| 6,153,161 A | 11/2000 | Fetzer et al. | |
| 6,174,835 B1 | 1/2001 | Naito et al. | |
| 7,732,369 B2 | 6/2010 | Koch | |
| 8,512,662 B2 | 8/2013 | Chang et al. | |
| 8,668,893 B2 | 3/2014 | Han et al. | |
| 8,845,987 B1 | 9/2014 | Nazarpoor et al. | |
| 8,858,903 B2 | 10/2014 | Nazarpoor et al. | |
| 9,238,196 B2 | 1/2016 | Schwefer et al. | |
| 9,427,730 B2 | 8/2016 | Nazarpoor et al. | |
| 9,468,912 B2 | 10/2016 | Nazarpoor et al. | |
| 9,731,279 B2 | 8/2017 | Nazarpoor et al. | |
| 9,861,964 B1 | 1/2018 | Nazarpoor et al. | |
| 10,253,669 B2 | 4/2019 | Nazarpoor et al. | |
| 2004/0086442 A1 | 5/2004 | Vierheilig | |
| 2006/0193971 A1* | 8/2006 | Tietz | H01M 8/0204 427/126.6 |
| 2014/0336044 A1 | 11/2014 | Nazarpoor et al. | |
| 2014/0357475 A1 | 12/2014 | Nazarpoor et al. | |
| 2014/0357479 A1 | 12/2014 | Nazarpoor et al. | |
| 2015/0148225 A1 | 5/2015 | Nazarpoor et al. | |
| 2015/0174555 A1 | 6/2015 | Nitta et al. | |
| 2016/0136619 A1 | 5/2016 | Nazarpoor et al. | |
| 2016/0167023 A1 | 6/2016 | Nazarpoor et al. | |
| 2016/0263561 A1 | 9/2016 | Nazarpoor et al. | |
| 2016/0361710 A1 | 12/2016 | Nazarpoor et al. | |
| 2017/0095800 A1 | 4/2017 | Nazarpoor et al. | |
| 2018/0296978 A1* | 10/2018 | Peck | B01J 23/72 |

FOREIGN PATENT DOCUMENTS

| | | |
|---|---|---|
| CN | 107790116 A | 3/2018 |
| CN | 109603842 A | 4/2019 |
| CN | 109894124 A | 6/2019 |
| GB | 1366217 A | 9/1974 |
| IN | 106824196 A | 6/2017 |
| JP | H07100130 B2 * | 11/1995 ............ B01D 53/46 |
| JP | 2997387 B2 | 1/2000 |
| JP | 2011058468 A | 3/2011 |
| KR | 2006096609 A | 9/2006 |
| KR | 100655133 B1 | 12/2006 |
| KR | 20160072283 A | 6/2016 |
| WO | 2003061821 A1 | 7/2003 |
| WO | 2010116062 A1 | 10/2010 |
| WO | 2014183002 A1 | 11/2014 |
| WO | 2016140641 A1 | 9/2016 |
| WO | 2016/203371 A1 | 12/2016 |
| WO | 107744812 A | 3/2018 |

OTHER PUBLICATIONS

Abu-Zied et al ("Enhanced direct N2O decomposition over CuxCo1-xCo2O4 (0.0 ≤x≤ 1.0) spinel-oxide catalysts", J Ind Eng Chem. 21 (2015) 814-821). (Year: 2015).*
Amrousse et al (Substituted ferrite MxFe1−xFe2O4 (M = Mn, Zn) catalysts for N2O catalytic decomposition, Cata Commun. 26 (2012) 194-198). (Year: 2012).*
Machine Translation for JP-H07100130 (Year: 1995).*
Daniel A. Aguilera et al., "Cu-Mn and Co-Mn catalysts synthesized from hydrotalcites and their use in the oxidation of VOCs", Applied Catalysis B: Environmental, Feb. 23, 2011, pp. 144-150, 104, Elsevier.
Yizhi Xiang et al., "Cobalt-copper based catalysts for higher terminal alcohols synthesis via Fischer-Tropsch reaction", Journal of Energy Chemistry, Oct. 5, 2016, pp. 895-906, 25, Elservier.
D. Fino et al. "Cataytic removal of NOx and diesel soot over nanostructured spinel-type oxides", Journal of Catalysis, 242 (2006) 38-47, Elsevier.
Paul A. Wright et al., "Mixed-Metal Amorphous and Spinel Phase Oxidation Catalysts: Characterization by X-ray Diffraction, X-ray Absorption, Electron Microscopy, and Catalytic Studies of Systems Containing Copper, Cobalt, and Manganese", Chem. Mater, Apr. 1, 1992, pp. 1053-1065.
L. Zhang et al., "Effect of precursors on the structure and activity of CuO-CoO/Al2O3 catalysts for NO reduction by CO", Journal of Colliod and Interface Science, Jul. 3, 2017, 45 pages.

* cited by examiner

1

CATALYST FOR DIRECT NOX DECOMPOSITION AND A METHOD FOR MAKING AND USING THE CATALYST

TECHNICAL FIELD

Embodiments relate generally to ternary spinel mixed oxide catalyst materials for conversion of undesired components in a combustion exhaust, a method of making the catalyst materials, and a method of using the catalyst materials for the direct decomposition of NOx.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

More stringent NOx emission requirements for automobile engines and other industries and the desire for higher fuel efficiency will require catalytic NOx abatement technologies that are effective in the presence of excess oxygen. Direct NO decomposition to $N_2$ and $O_2$ can be an attractive alternative to NOx traps and selective catalytic reduction. The development of an effective catalyst for direct NO decomposition would eliminate the use of reducing agents, significantly simplifying the NO removal process, thereby decreasing fuel costs to remove NO from the exhaust of various combustion processes.

However, only catalysts that work at high temperatures (e.g., >600° C.) and a few zeolite catalysts that work at lower temperatures have been reported and none are known to be commercialized. Additionally, at lower reaction temperatures the selectivity to nitrogen ($N_2$) is generally poor and insufficient for practical application.

The oxidation of NO to $NO_2$ is a thermodynamically favorable reaction at lower reaction temperatures and inhibits formation of $N_2$ during the decomposition. Accordingly, it would be desirable to provide a catalyst for the removal of NOx from exhaust gas with good selectivity to $N_2$ formation while maintaining high overall activity for automotive emission reactions.

SUMMARY

This section provides a general summary of the disclosure and is not a comprehensive disclosure of its full scope or all of its features.

In one aspect, there is disclosed a ternary spinel mixed oxide catalyst material for the direct decomposition of NOx to $N_2$ and $O_2$. The ternary spinel mixed oxide catalyst material has a formula of $Mn_xCu_yCo_{3.0-x-y}O_4$, wherein $0.01 < x \leq 1.5$ and $0.01 < y \leq 1.5$. In one embodiment, $0.1 \leq x \leq 1.5$. In another embodiment, $0.01 < x \leq 0.3$. In yet another embodiment, Mn is 0.1.

In another aspect, there is provided a method for direct decomposition removal of NOx from combustion engine exhaust at a temperature range of from 400-800° C. The method comprises exposing a gas mixture from a combustion engine having NOx to a ternary spinel mixed oxide catalyst material having a formula of $Mn_xCu_yCo_{3.0-x-y}O_4$, wherein $0.01 < x \leq 1.5$ and $0.01 < y \leq 1.5$. In accordance with embodiments, $0.1 \leq x \leq 1.5$. In one embodiment, $0.01 < x \leq 0.3$. In another embodiment, Mn is 0.1. In another embodiment, the combustion engine exhaust is at a temperature range of about 400° C. to about 650° C. In another embodiment, the combustion engine exhaust is at a temperature of about 500° C.

In another aspect, there is provided a method of making a ternary spinel mixed oxide catalyst material for the direct decomposition of NOx to $N_2$ and $O_2$ having a formula of $Mn_xCu_yCo_{3.0-x-y}O_4$, wherein $0.01 < x \leq 1.5$ and $0.01 < y \leq 1.5$. The method comprises co-precipitation using a precipitating agent selected from the group consisting of NaOH, $Na_2CO_3$, and $(NH_4)_2CO_3$; drying the obtained precipitate, and calcining at 500° C. for 1 hr at 2° C./min. In accordance with embodiments, $0.1 < x \leq 1.5$. In another embodiment, $0.01 < x \leq 0.3$. In yet another embodiment, Mn is 0.1.

In another aspect, there is provided a ternary spinel mixed oxide catalyst material for the direct decomposition of NOx to $N_2$ and $O_2$ having a formula of $Mn_xCu_yCo_{3.0-x-y}O_4$, produced using the co-precipitation method described herein. In one embodiment, $0.01 < x \leq 1.5$ and $0.01 < y \leq 1.5$. In another embodiment, $0.1 \leq x \leq 1.5$. In another embodiment, $0.01 < x \leq 0.3$. In yet another embodiment, Mn is 0.1.

In another aspect, there is provided a catalytic converter for the direct decomposition removal of NOx from an exhaust gas stream flowing at a temperature of from about 400° C. to about 650° C. The catalytic converter comprises an inlet configured to receive the exhaust gas stream into an enclosure; an outlet configured to allow the exhaust gas stream to exit the enclosure; and a catalyst contained inside the enclosure. The catalyst comprises a ternary spinel mixed oxide catalyst material for the direct decomposition of NOx to $N_2$ and $O_2$ having a formula of $Mn_xCu_yCo_{3.0-x-y}O_4$. In one embodiment, $0.01 < x \leq 1.5$ and $0.01 < y \leq 1.5$. In another embodiment, $0.1 \leq x \leq 1.5$. In another embodiment, $0.01 < x \leq 0.3$. In another embodiment, Mn is 0.1. In another embodiment, the combustion engine exhaust is at a temperature range of about 400° C. to about 650° C. In another embodiment, the combustion engine exhaust is at a temperature of about 500° C.

Further areas of applicability and various methods of enhancing the above technology will become apparent from the description provided herein. The description and specific examples in this summary are intended for purposes of illustration only and are not intended to limit the scope of the present disclosure.

DRAWINGS

The present teachings will become more fully understood from the detailed description and the accompanying drawings wherein.

Figure 1:
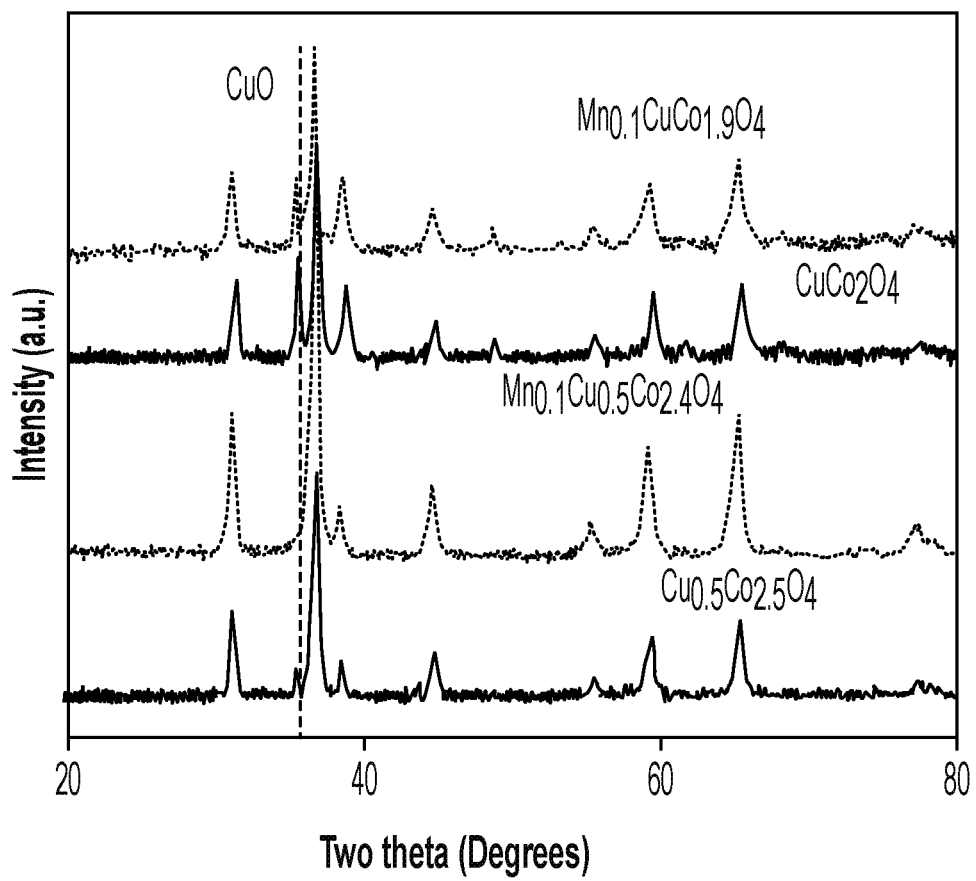
FIG. 1 is a plot of X-ray diffraction profiles of the $CO_3O_4$, $CuCo_2O_4$ and $Mn_{0.1}Co_{1.9}CuO_4$ catalysts.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DESCRIPTION

The present teachings provide ternary spinel mixed oxide catalyst materials for direct NO decomposition applications to remove NOx from exhaust gas systems. The ternary spinels refer to spinels consisting of 3 transition metals. The materials include Mn as a dopant for Cu—Co, which improves the activity, and stability of Cu—Co catalysts for direct NO decomposition. Direct decomposition, as discussed herein, refers to catalytic transformation of nitrogen oxides to elemental nitrogen and oxygen. This differs, for example, from catalytic reduction of nitrogen oxides to ammonia and water. The low temperature (i.e., from about 400° C. to about 650° C.), direct decomposition is accomplished without the need of a reductant or secondary reducing reagents (i.e., $H_2$, CO, $C_3H_6$ or other hydrocarbons, and/or soot), thereby improving fuel efficiency. This is greatly beneficial to improve the energy utilization of a vehicle engine because the reducing agents of carbon monoxide and unburnt hydrocarbons are produced as a result of inefficient combustion.

In one aspect, the ternary spinel mixed oxide catalyst materials have a general formula of $Mn_xCu_yCo_{3.0-x-y}O_4$, wherein $0.01<x\leq1.5$ and $0.01<y\leq1.5$. In an embodiment, $0.1<x\leq1.5$. In another embodiment $0.01<x\leq0.3$. In another embodiment, $0.1<y\leq1.0$. In yet another embodiment, $x=0.1$ and $y=0.5$.

In another aspect, the ternary spinel mixed oxide catalyst materials are active in a temperature region preferably from about 400° C. to about 800° C., and more preferably in a temperature region of about 400° C. to about 650° C., covering the typical exhaust temperatures of emission gas from gasoline or diesel engines. In another embodiment, the catalysts are active at a temperature of about 500° C.

The catalyst material of the present disclosure can be used in a chamber or enclosure, such as a catalytic converter having and inlet and an outlet. As is commonly known to those of ordinary skill in the art, such a chamber or enclosure can be configured to receive an exhaust gas stream through the inlet and to exit the exhaust gas stream through the outlet such that the exhaust gas stream has a particular defined flow chamber direction.

In yet another aspect, a catalyst material of the present disclosure is synthesized by a co-precipitation method using a precipitating agent selected from NaOH, $Na_2CO_3$, $(NH_4)_2CO_3$; drying the obtained precipitate; and calcining at 500° C. for a time period of from 1 hr to 5 hrs at a ramp rate of from 0.1° C./min. to 20° C./min. In one embodiment, the time period is 1 hr. In another embodiment the ramp rate is 2° C./min. In yet another embodiment the precipitating agent is NaOH.

Examples

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Synthesis and Material Characterization

The Mn doped Cu—Co ternary spinel oxide catalyst materials were synthesized by a co-precipitation method using NaOH as a precipitating agent. The required amounts of $Co(NO_3)_3$, $Cu(NO_3)_3$ and $Mn(NO_3)_2$ were dissolved separately in deionized water and mixed. A 2M (200 ml) solution of sodium hydroxide (NaOH) was prepared and slowly added to the salt solution dropwise. The pH of the solution was constantly monitored as the NaOH solution was added. The reactants were constantly stirred using a magnetic stirrer until a pH level of 9-10 was reached. To get free particles from sodium compounds, the precipitate was then washed several times with distilled water. The supernatant liquid was then decanted and filtered to obtain the precipitate. The precipitate was then dried overnight at 120° C. The acquired substance was then grinded into a fine powder. The catalyst materials were calcined at 500° C. for 1 hour at 2° C./min.

Mn doped Cu—Co ternary spinel mixed oxide catalyst materials having the general formula $Mn_xCu_yCo_{3-x-y}O_4$ where $0.01<x\leq1.5$ and $0.01<y\leq1.5$ were synthesized as described above by varying the ratios between Co, Cu and Mn, accordingly. Examples include, but are not limited to, the following:

$Mn_{0.1}Cu_1Co_{1.9}O_4$,
$Mn_{0.1}Cu_{1.5}Co_{1.4}O_4$,
$Mn_{0.1}Cu_{1.1}Co_{1.8}O_4$,
$Mn_{0.1}Cu_{0.4}Co_{2.5}O_4$,
$Mn_{0.1}Cu_{0.5}Co_{2.4}O_4$,
$Mn_{0.1}Cu_{0.1}Co_{2.8}O_4$,
$Mn_{0.1}Cu_{0.2}Co_{2.7}O_4$, and
$Mn_{0.1}Cu_{0.3}Co_{2.6}O_4$.

Performance Evaluation

The phase composition was determined by X-ray powder diffraction (XRD) using a Rigaku SmartLab X-ray diffractometer using Cu Ka radiation (1¼ 1.5405 A). A glass holder was used to support the sample. The scanning range was from 10 to 80 (2θ) with a step size of 0.02 and a step time of 1 s. The XRD phases present in the samples were identified with the help of ICDD-JCPDS data files.

Figure 2:
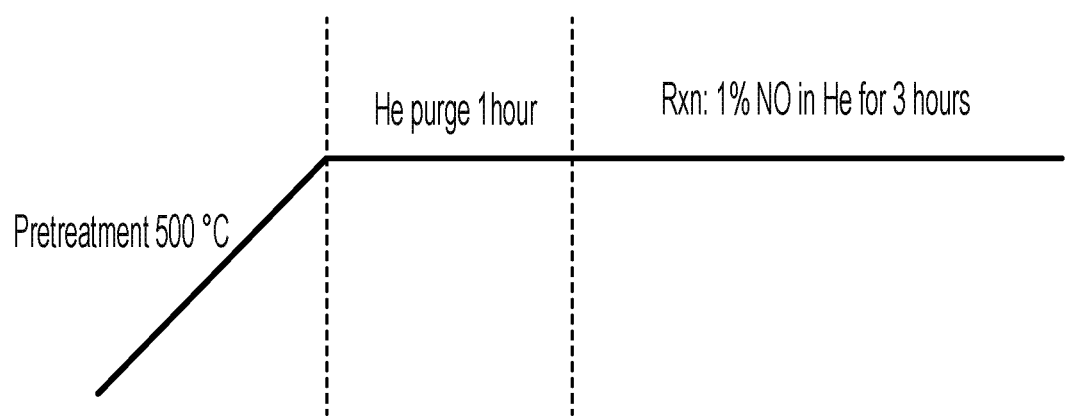
FIG. 2 illustrates Scheme 1 for direct NOx decomposition measurements.

The direct NOx decomposition measurements were performed in a fixed bed flow reactor following Scheme 1 as shown in FIG. 2. The direct NOx decomposition measurements were performed using ~1% NOx balance helium with a gas hourly space velocity of 2,100 h-1 and at temperature region of 500° C. Before the reaction, catalysts were pretreated at 500° C. in the presence of 20% $O_2$/He. After the pretreatment, the bed temperature was kept at 500° C. and direct NOx decomposition measurements were collected for 3 hours until it reached steady state. The direct NO decomposition activity values of Mn doped Cu—Co catalysts are presented in Table 1 along with the pure Cu—Co catalysts. As shown in Table 1 all the Mn doped Cu—Co catalysts exhibit better activity compared to the Cu—Co catalysts. At the same Cu concentration, Mn doped samples exhibits higher activity compared to pure Cu—Co samples. Among the various catalysts, $Mn_{0.1}Cu_{0.5}Co_{2.4}O_4$ catalyst exhibits best activity.

TABLE 1

Direct NO decomposition activity values of Cu—Co and Mn—Cu—Co catalysts

| Catalysts | Activity (μmol/g/s) |
| --- | --- |
| $CuCo_2O_4$ | 0.013 |
| $Cu_{1.5}Co_{1.5}O_4$ | 0.017 |

TABLE 1-continued

Direct NO decomposition activity values of Cu—Co and Mn—Cu—Co catalysts

| Catalysts | Activity (μmol/g/s) |
| --- | --- |
| $Mn_{0.1}Co_{1.9}Cu_1O_4$ | 0.024 |
| $Mn_{0.1}Co_{1.4}Cu_{1.5}O_4$ | 0.023 |
| $Mn_{0.1}Co_{1.8}Cu_{1.1}O_4$ | 0.032 |
| $Cu_{0.4}Co_{2.6}O_4$ | 0.034 |
| $Mn_{0.1}Cu_{0.4}Co_{2.5}O_4$ | 0.0461 |
| $Cu_{0.5}Co_{2.5}O_4$ | 0.031 |
| $Mn_{0.1}Cu_{0.5}Co_{2.4}O_4$ | 0.0493 |

Figure 3:
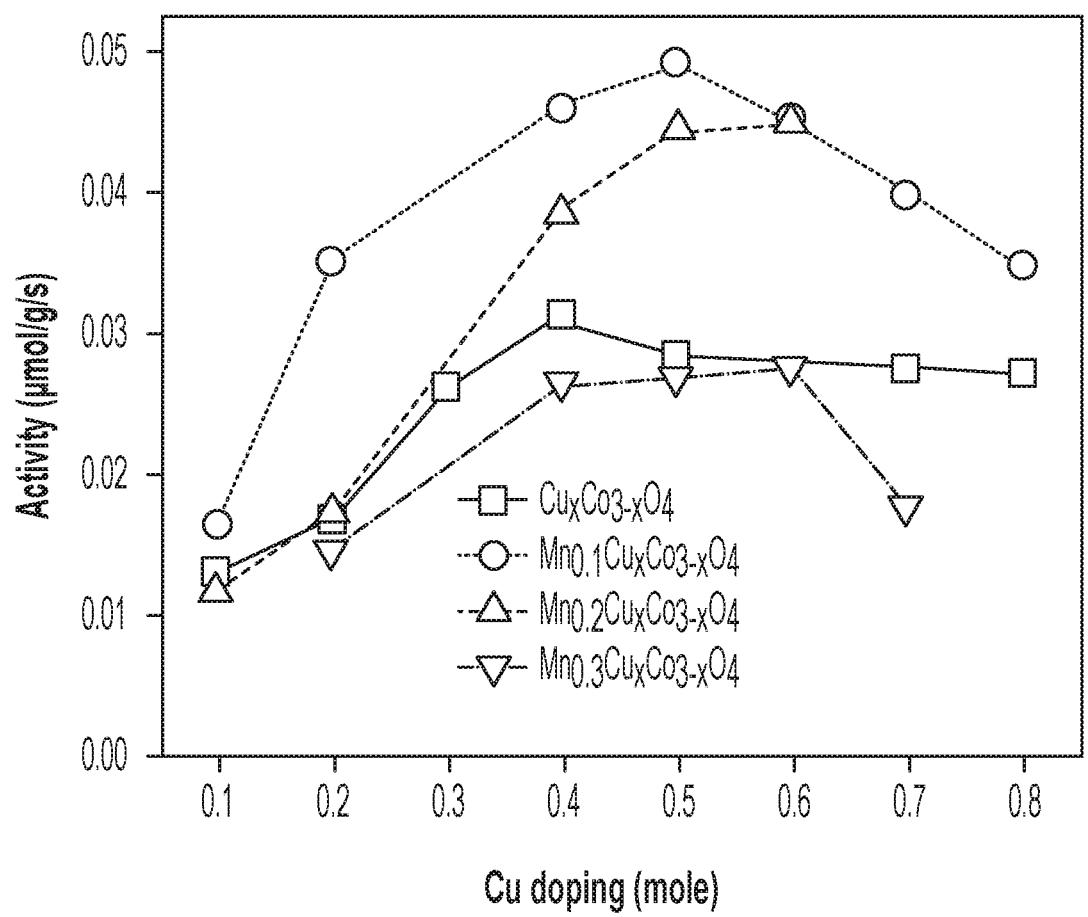
FIG. 3 illustrates NO conversion profiles (activity) over Mn at 0.1, 0.2 and 0.3 moles doped into $Cu_yCo_{3-y}O_4$ with respect to Cu doping amount (moles).

Further, 0.1, 0.2, and 0.3 moles of Mn were doped into $Cu_yCo_{3-y}O_4$ and the catalyst were evaluated for direct NO decomposition. As shown in FIG. 3, doping with 0.1 moles of Mn, i.e., $Mn_{0.1}Cu_{0.5}Co_{2.4}O_4$, exhibits superior activity.

Figure 4:
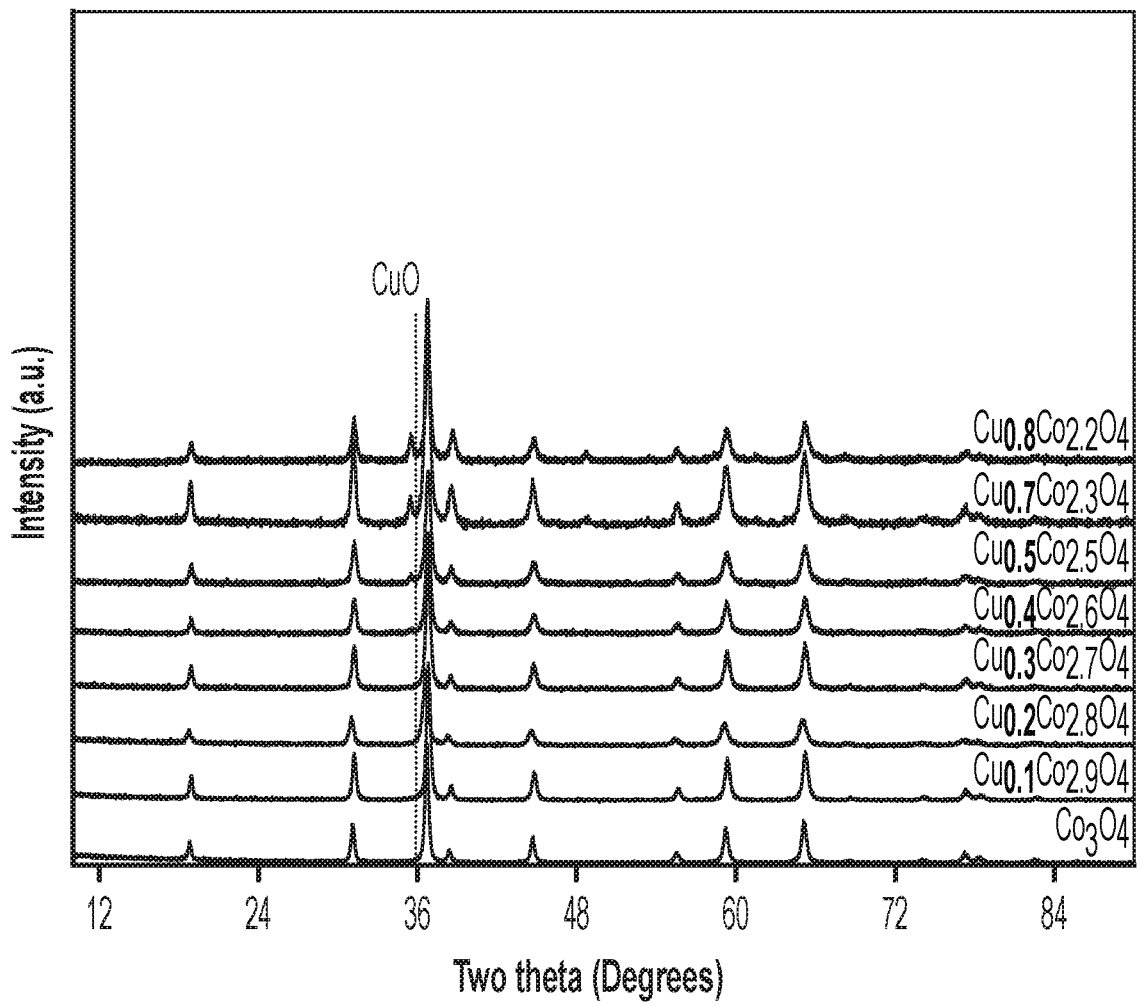
FIG. 4 illustrates X-ray diffraction profiles of the $Cu_yCo_{3-y}O_4$ catalysts.
Figure 5:
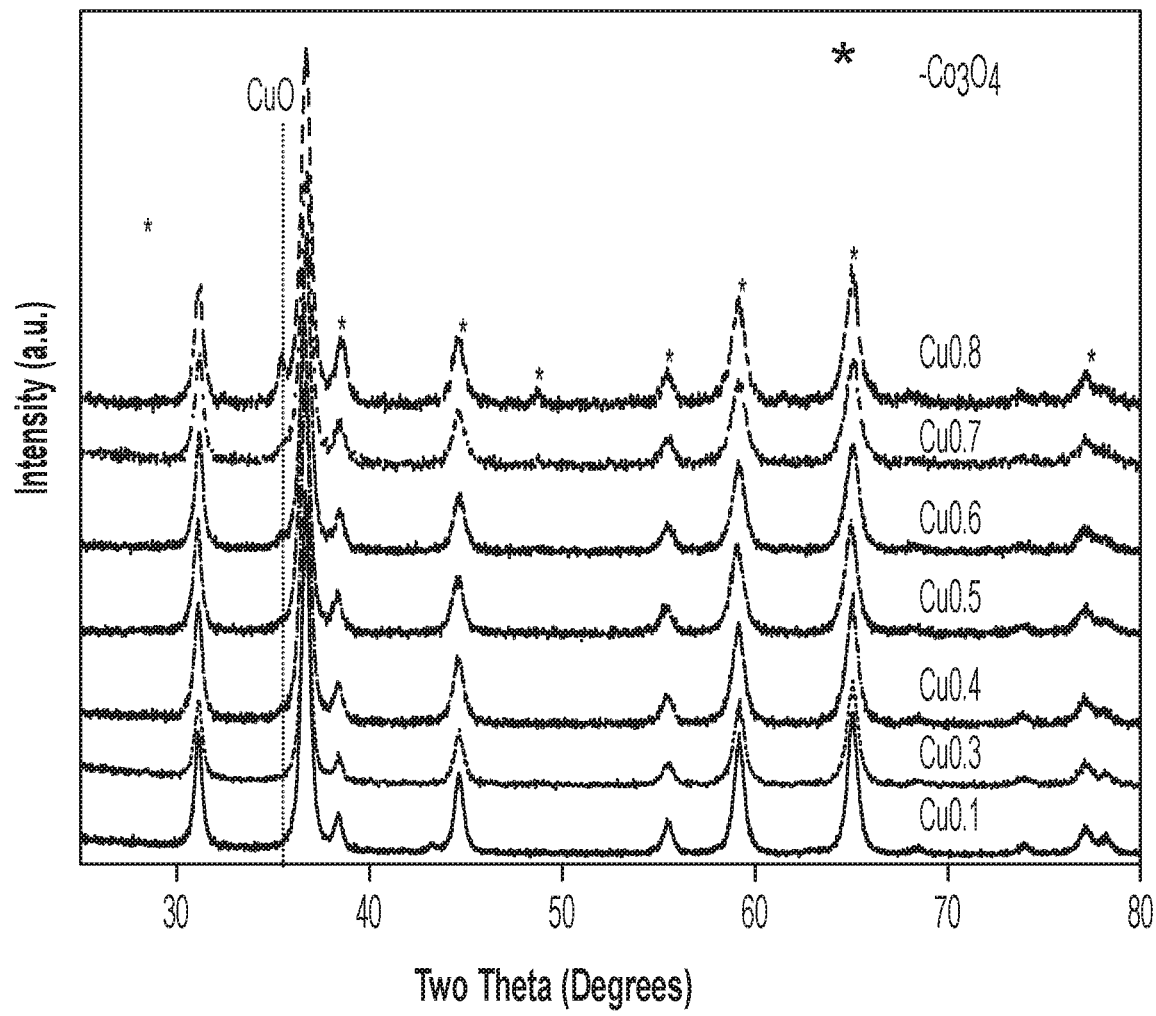
FIG. 5 illustrates X-ray diffraction profiles of the $Mn_{0.1}Cu_yCo_{3-y}O_4$ catalysts.
Figure 6:
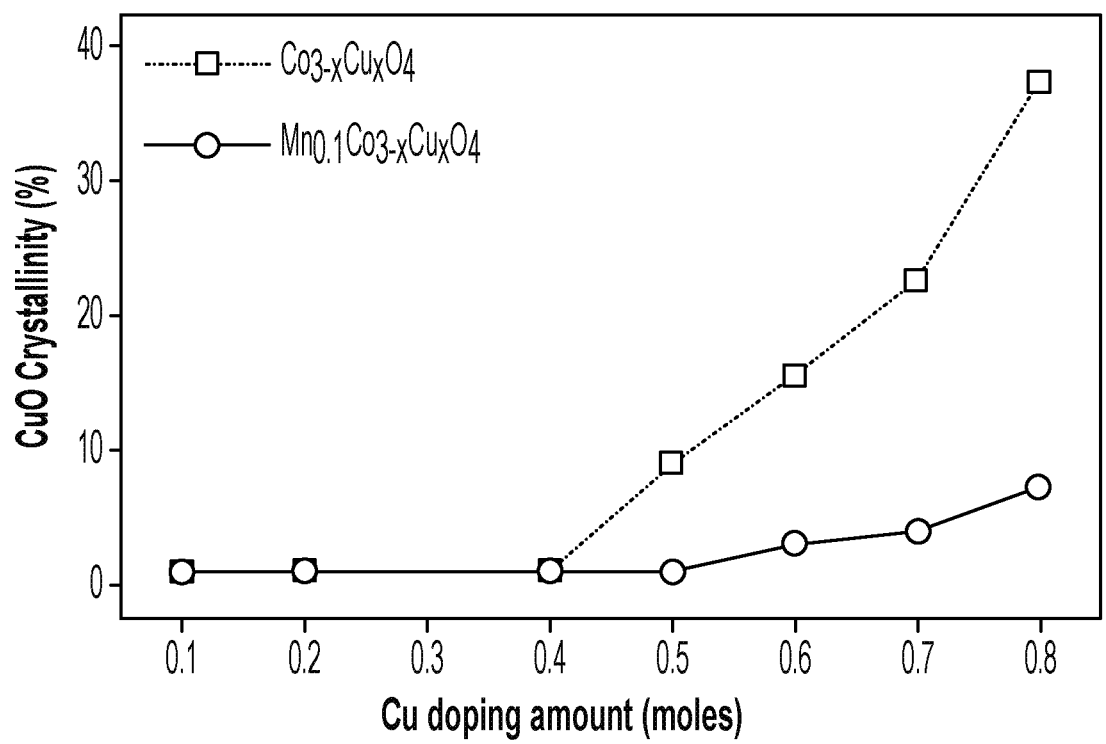
FIG. 6 illustrates CuO crystallinity formation (%) vs Cu doping amounts (moles) for the $Cu_yCo_{3-y}O_4$ and $Mn_{0.1}Cu_yCo_{3-y}O_4$.

X-ray diffraction profiles of $Cu_yCo_{3-y}O_4$ and $Mn_{0.1}Cu_yCo_{3-y}O_4$ were taken to determine the influence of Cu on the $CO_3O_4$ structure in the presence or absence of manganese (see FIG. 4 and FIG. 5). FIG. 6 shows that Mn delays the formation of crystalline CuO compared to pure $Cu_yCo_{3-y}O_4$ and that Mn is responsible for the higher activity. Table 3 also shows that Mn increases the lattice constant of the $CO_3O_4$ and incorporates more Cu into the $CO_3O_4$ lattice and is still responsible for the higher activity.

TABLE 3

$Co_3O_4$ lattice constant values of the $Cu_yCo_{3-y}O_4$ and $Mn_{0.1}Cu_yCo_{3-y}O_4$ catalysts

| Catalyst | Lattice constant |
| --- | --- |
| $Cu_{0.1}Co_{2.9}O_4$ | 8.0854 |
| $Cu_{0.3}Co_{2.7}O_4$ | 8.095 |
| $Cu_{0.4}Co_{2.6}O_4$ | 8.10675 |
| $Mn_{0.1}Cu_{0.1}Co_{2.8}O_4$ | 8.112 |
| $Mn_{0.1}Cu_{0.3}Co_{2.6}O_4$ | 8.11438 |
| $Mn_{0.1}Cu_{0.4}Co_{2.5}O_4$ | 8.1206 |
| $Mn_{0.1}Cu_{0.5}Co_{2.4}O_4$ | 8.129 |

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalyst having activity for direct decomposition removal of $NO_x$ from an exhaust gas stream to $N_2$ and $O_2$, the catalyst comprising a material which comprises Mn-doped Cu—Co, wherein the Mn-doped Cu—Co comprises $Mn_xCu_yCo_{3.0-x-y}O_4$, wherein $0.1<x\le0.3$ and $0.1<y\le0.9$, said catalyst having activity for direct decomposition removal of NOx at a temperature of about 500° C.

2. The catalyst of claim 1, wherein the Mn-doped Cu—Co is selected from the group consisting of:
$Mn_{0.1}Cu_{0.4}Co_{2.5}O_4$,
$Mn_{0.1}Cu_{0.5}Co_{2.4}O_4$,
$Mn_{0.1}Cu_{0.1}Co_{2.8}O_4$,
$Mn_{0.1}Cu_{0.2}Co_{2.7}O_4$, and
$Mn_{0.1}Cu_{0.3}Co_{2.6}O_4$.

3. The catalyst of claim 1, wherein $0.1<x\le0.3$ and $0.1<y\le0.5$.

4. The catalyst of claim 1, wherein the Mn-doped Cu—Co is $Mn_{0.1}Cu_{0.5}Co_{2.4}O_4$.

5. A method for direct decomposition removal of $NO_x$ from combustion engine exhaust, said method comprising:
exposing an exhaust gas having $NO_x$ to a catalyst material which comprises Mn-doped Cu—Co having activity for direct decomposition to convert $NO_x$ to $N_2$ and $O_2$, wherein the Mn-doped Cu—Co comprises $Mn_xCu_yCo_{3.0-x-y}O_4$, wherein $0.1<x\le0.3$ and $0.1<y\le0.9$, and wherein the direct decomposition removal of NOx is at a temperature of about 500° C.

6. The method of claim 5, wherein the Mn-doped Cu—Co is selected from the group consisting of:
$Mn_{0.1}Cu_{0.4}Co_{2.5}O_4$,
$Mn_{0.1}Cu_{0.4}Co_{2.4}O_4$,
$Mn_{0.1}Cu_{0.1}Co_{2.8}O_4$,
$Mn_{0.1}Cu_{0.2}Co_{2.7}O_4$, and
$Mn_{0.1}Cu_{0.3}Co_{2.6}O_4$.

7. The method of claim 5, wherein $0.1<x\le0.3$ and $0.1<y\le0.5$.

8. The method of claim 5, wherein the Mn-doped Cu—Co is $Mn_{0.1}Cu_{0.5}Co_{2.4}O_4$.

9. A method of making a catalyst for removal of $NO_x$ from a combustion engine, the catalyst comprising a material which comprises Mn-doped Cu—Co, wherein the Mn-doped Cu—Co comprises $Mn_xCu_yCo_{3.0-x-y}O_4$, wherein $0.1<x\leq0.3$ and $0.1<y\leq0.9$, said catalyst having activity for direct decomposition removal of NOx at a temperature of about 500° C., the method comprising:
- Co-precipitation using a precipitating agent selected from the group consisting of NaOH, $Na_2CO_3$, and $(NH_4)_2CO_3$;
- drying the obtained precipitate; and
- calcining at 500° C. for a time period of from 1 hr to 5 hrs at a ramp rate of from 0.1° C./min. to 20° C./min.

10. The method according to claim 9, wherein the precipitating agent is NaOH.

11. The method according to claim 9, wherein the time period is 1 hr.

12. The method according to claim 9, wherein the ramp rate is 2° C./min.

13. A catalytic converter, comprising:
- a body defining a chamber, the body having an inlet to receive an exhaust gas stream into the chamber, and an outlet to allow the exhaust gas stream to exit the body; and
- a catalyst arranged in the chamber for direct decomposition removal of $NO_x$ from exhaust gas stream, the catalyst comprising a material which comprises Mn-doped Cu—Co having activity for direct decomposition to convert $NO_x$ to $N_2$ and $O_2$, wherein the Mn-doped Cu—Co comprises $Mn_xCu_yCo_{3.0-x-y}O_4$, wherein $0.1<x\leq0.3$ and $0.1<y\leq0.9$.

14. The catalytic converter of claim 13, wherein the Mn-doped Cu—Co is selected from the group consisting of:
$Mn_{0.1}Cu_{0.4}Co_{2.5}O_4$,
$Mn_{0.1}Cu_{0.5}Co_{2.4}O_4$,
$Mn_{0.1}Cu_{0.1}Co_{2.8}O_4$,
$Mn_{0.1}Cu_{0.2}Co_{2.7}O_4$, and
$Mn_{0.1}Cu_{0.3}Co_{2.6}O_4$.

* * * * *